United States Patent
Pierron et al.

(10) Patent No.: US 7,627,234 B2
(45) Date of Patent: Dec. 1, 2009

(54) ELECTRICAL HEATING DEVICE, PARTICULARLY FOR AN AUTOMOBILE VEHICLE

(75) Inventors: Frédéric Pierron, Rambouillet (FR); Christophe Marange, Sucy en Brie (FR); Gilbert Terranova, Le Perray en Yvelines (FR); Olivier Colette, Le Mesnil St. Denis (FR)

(73) Assignee: Valeo Systems Thermiques S.A.S., Le Mesnil Saint Denis (FR)

( * ) Notice: Subject to any disclaimer, the term of this patent is extended or adjusted under 35 U.S.C. 154(b) by 269 days.

(21) Appl. No.: 10/558,605

(22) PCT Filed: Jun. 1, 2004

(86) PCT No.: PCT/FR2004/001354

§ 371 (c)(1),
(2), (4) Date: Nov. 29, 2005

(87) PCT Pub. No.: WO2005/004538

PCT Pub. Date: Jan. 13, 2005

(65) Prior Publication Data

US 2007/0084858 A1   Apr. 19, 2007

(30) Foreign Application Priority Data

Jun. 6, 2003   (FR) .................................. 03 06890

(51) Int. Cl.
*F24D 13/00* (2006.01)
(52) U.S. Cl. .................. 392/347; 219/202; 219/504
(58) Field of Classification Search ............. 219/202, 219/504, 505, 520, 537–553; 392/347, 497–503
See application file for complete search history.

(56) References Cited

U.S. PATENT DOCUMENTS 5,057,672 A * 10/1991 Bohlender et al. ......... 219/540
6,392,207 B2 * 5/2002 Beetz et al. ................ 219/530
6,810,203 B2 * 10/2004 Alban et al. ............... 392/347

FOREIGN PATENT DOCUMENTS

FR         2794605     * 12/2000

* cited by examiner

*Primary Examiner*—Thor S Campbell
(74) *Attorney, Agent, or Firm*—Howard & Howard Attorney PLLC

(57) ABSTRACT

The invention relates to a heating device comprising a housing (15), through which air to be heated can pass and which delimits a heating space controlled by a power supply control circuit connected to a power source. The heating space includes electric heating modules (14), each heating module consisting of a first and second metal tape (10, 10) that are essentially parallel in a transversal direction (D) and of a positive temperature coefficient resistive elements (12) fixed between the two metal tapes.

19 Claims, 5 Drawing Sheets

ELECTRICAL HEATING DEVICE, PARTICULARLY FOR AN AUTOMOBILE VEHICLE

The invention relates to an air heating device, particularly for automobile vehicles.

In existing embodiments, heating of air in the passenger compartment of an automobile vehicle or de-misting or de-icing is done through a heat exchange between an airflow and an engine coolant located in the circulation duct of the air to be heated. However, when the vehicle is started, heat transported by the engine coolant may be insufficient to enable fast and effective heating of the passenger compartment for a certain time period.

In other embodiments, an electrical heating device on the airflow path towards the passenger compartment immediately on the downstream side of the heat exchanger is used in addition.

The heating device is thus switched on temporarily until the heat exchanger can heat the air by itself.

Such a heating device usually comprises resistive elements of the type with a positive temperature coefficient (PTC). These resistive elements are capable of self-temperature regulation, which prevents overheating.

PTC resistances are in the form of small blocks or "stones" located in electrodes. A set of PTC stones spaced apart from each other may be arranged between the electrodes and powered by them, thus forming a heating block.

Radiant elements are associated with electrodes to facilitate heat exchange with the airflow passing through the heating device. These radiant elements may be formed by folded or corrugated metallic ribbons placed in parallel and held mechanically in place on the electrodes, between which PTC stones are arranged. The heating block thus formed is arranged in a support frame.

A control circuit may also be housed on the support frame to selectively power the electrodes and to adjust the power output by the heating device. This heating device is used with an electrical power supply switch of the transistor type that will be used to select the electrodes.

In existing embodiments, the heating block, the control circuit and the support frame form a single assembly. It may be desirable to vary the surface area of the heating unit depending on the required heating power.

Furthermore, with such a unit assembly, it is impossible to take local action on an area of the heating block if the heating block is malfunctioning. The components of the heating block are held together either by a spring blade system that applies a mechanical pressure, or by the support frame. Thus, it is not possible to replace some of the components of the heating block independently of the unit assembly. Therefore, in the case of a local malfunction, the entire assembly has to be replaced and the cost of a malfunction can be high.

Furthermore, electrical heating devices according to prior art have a complex and expensive structure due to the large number of component parts, the necessary assembly time and the sensitivity of the PTC resistance power supply electrodes to corrosion.

The invention is intended to improve this situation.

It discloses a heating device comprising a housing through which air to be heated passes, delimiting a heating space controlled by an electrical power supply control circuit connected to a power supply source. Advantageously, the heating space comprises electrical heating modules, each heating module being composed of a first and a second metallic ribbon approximately parallel to each other along a transverse direction and resistive elements with a fixed positive temperature coefficient between the two metallic ribbons.

In particular, the resistive elements with a positive temperature coefficient may be fixed between the two metallic ribbons by gluing.

The resistive elements with the positive temperature coefficient may also be fixed between the two metallic ribbons by welding.

According to another aspect of the invention, the housing comprises heating compartments shaped to house a number of heating modules chosen as a function of the total required heating power.

The housing also comprises power supply compartments shaped to house power supply modules that can be connected to the electrical power supply control circuit and to a group consisting of at least one heating module, each power supply module comprising an electronic switching element.

The power supply control circuit is arranged on one side of the housing in a power supply control compartment while the power supply compartments are arranged in parallel close to the control circuit along the transverse direction and at an equal distance between them.

Each power supply module also comprises a metallic support connected to the power supply source onto which the electronic switching element is fixed.

In particular, the metallic support comprises insert moulding around the electronic switching module capable of maintaining electrical connections with the electronic switching element.

The zone delimited by insert moulding of the metallic support may include a sealed coating chosen from among silica gel, glue, and compounds that provide protection for the electronic switching element.

In addition, the metallic support may comprise louver type openings arranged on its surface, through which openings air to be heated passes so as to facilitate the dissipation of heat from the electronic switching element.

According to another aspect of the invention, each metal ribbon in a heating module is held on at least one longitudinal strip with a length matching that of the ribbons.

The strips in each heating module are provided with a connection plug on one end, the connection plugs of the strips all being located on the same side during assembly of the heating module.

In particular, the first metallic ribbon for each heating module may be longer than the second metallic ribbon, which creates an indentation with a generally rectangular shape in the heating module.

The power supply compartments are generally rectangular in shape while the width of a power supply compartment is approximately the same as the width of a heating compartment.

According to one particular embodiment, each power supply module may be connected to a group of two heating modules, while the two heating modules are arranged side by side.

According to this embodiment of the invention, the successive heating compartments are in contact and are aligned along the transverse direction, the indentations in two successive heating modules thus forming a rectangle within which a power supply compartment is arranged.

In another embodiment, each power supply module can be connected to a heating module, while the power supply module and the heating module associated with it are connected to form a modular element, each power supply compartment forming a modular compartment with an associated heating compartment.

According to another aspect of the invention, the heating device comprises a cover fixed on the housing by a connection system.

The metallic ribbons in each heating module may be provided with an electrical insulating coating and/or a protective coating against corrosion.

The power supply control compartment is separate from the power supply compartments.

The invention also discloses a method of assembling a heating device including a housing through which air to be heated can pass, starting from electrical heating modules and power supply modules that can be connected to an electrical power supply control circuit and to a group consisting of at least one heating module, characterised in that it comprises the following steps:

1) placing the power supply modules in the housing,
2) placing the heating modules in the housing,
3) positioning and fixing a cover on the housing,
4) performing a welding operation for an electrical connection between each power supply module and the group of associated heating modules,
5) positioning the electrical power supply control circuit on a power supply control compartment on one side of the housing,
6) performing an additional welding operation for an electrical connection between the electrical connections and the power supply control circuit,
7) positioning and fixing a cap on the control compartment.

Other characteristics and advantages of the invention will become clear after reading the following detailed description and the attached drawings in which.

Figure 1A:
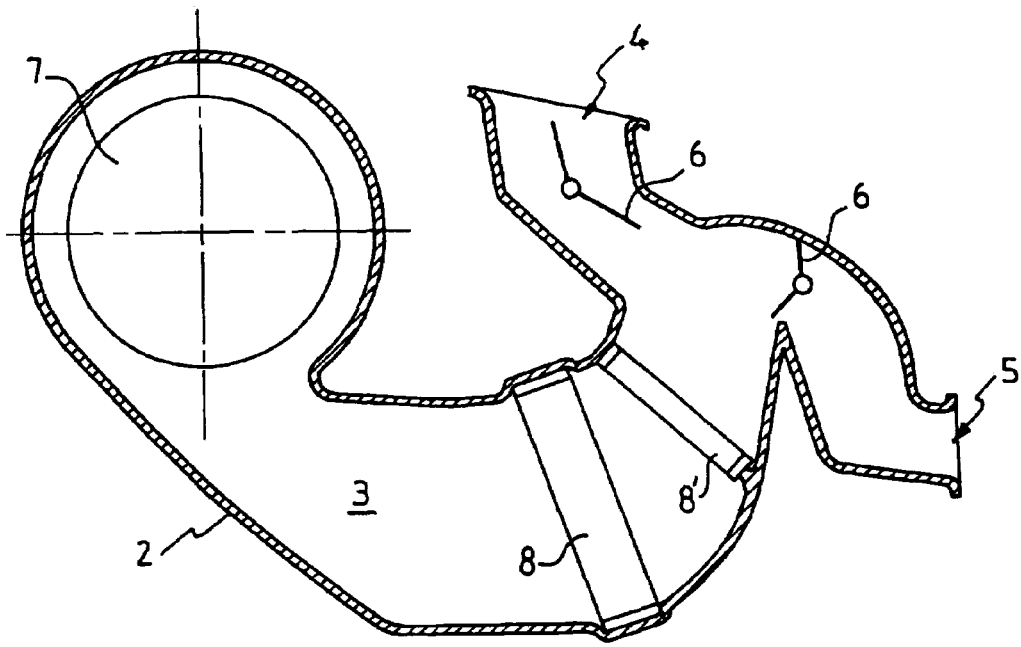
FIG. 1A shows an overview of a circulation duct in an automobile vehicle.

FIG. 1A shows an air circulation duct for an automobile vehicle. This duct comprises a housing 2 delimiting a channel 3 through which air to be heated will pass. Air passing through the channel is transferred towards heating and demisting/de-icing air vents 4 and 5 before being distributed in the passenger compartment through mixing and distribution flaps 6.

The airflow in the channel 3 is produced by a fan 7 or a blower, from an outer airflow or a recirculation airflow from the passenger compartment. When required, air can be heated by a heat exchanger 8 operating with the engine coolant and an electrical heating device 8'. The heat exchanger 8 is arranged on the upstream side of the heating device 8' in the channel 3. As an alternative, air can be heated by the electrical heating device 8' alone.

The electrical heating device can occupy the entire section of the channel 3. As an alternative, it can occupy part of the section of the channel 3, in which case only part of the airflow passes through the electrical heating device 8' while the other part bypasses it.

In the remainder of the detailed description, the electrical heating device 8' will be described with reference to FIGS. 1B to 6.

Figure 2:
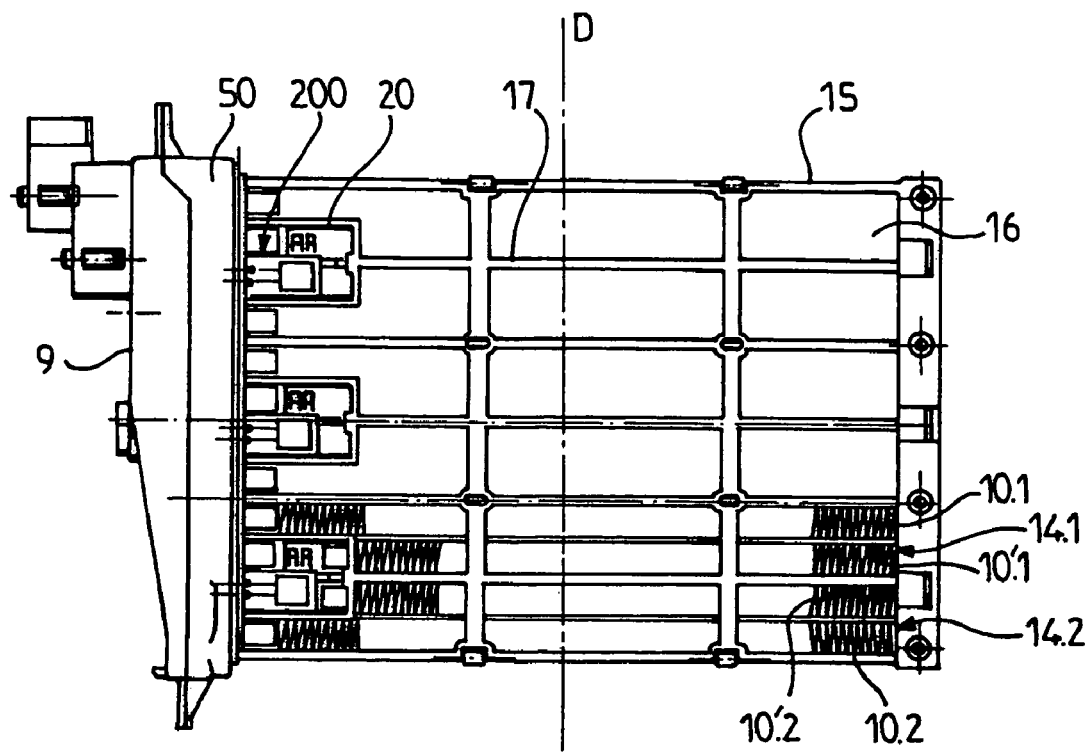
FIG. 2 is a front view of the heating device according to the invention.

FIG. 2 shows a diagram of the electrical heating device according to the invention. The electrical heating device comprises a housing 15, for example made of plastic, through which air to be heated can pass and delimiting a heating space controlled by an electrical power supply control circuit connected to a power supply source. The heating space comprises electrical heating modules 14. Heating compartments 16 are provided in the housing 15 shaped to house a number of heating modules 14 chosen as a function of the required heating power.

The heating compartments 16 are arranged parallel to each other along a transverse direction D. In particular, each heating compartment extends along the entire length of the housing, so that they are directly exposed to an airflow passing through them.

The electrical heating device controller 8' is made by the power supply control circuit. The power supply control circuit is mounted on a printed circuit board and is housed on one of the sides of the housing 15, in a power supply control compartment 50. The control circuit is also protected by a cap 9.

The power supply control circuit may be mounted either perpendicular to the transverse axis D, or parallel to the transverse axis D.

Figure 6:
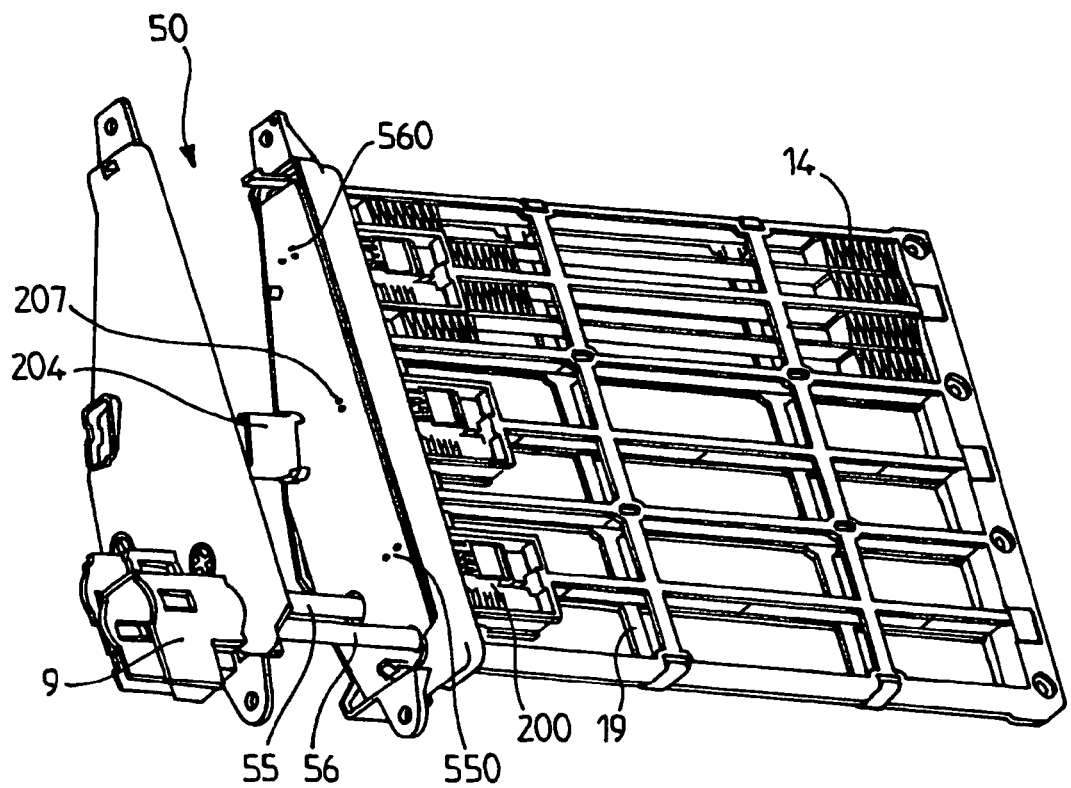
FIG. 6 shows the connection points of the heating device with the power supply control circuit.

With reference to FIG. 6, the control circuit receives information through a connector 204 and is connected to a power supply source by bus bars 55 and 56 or through the connector 204. For example, the bus bar 55 is at the +12 V potential, while the bus bar 56 is at the ground potential GND.

The housing also comprises power supply compartments 20 shaped to house power supply modules 200. These power supply modules are connected to the power supply control circuit and to a group of heating modules comprising at least one heating module. Each power supply module 200 comprises an electronic switching element or a power supply switch capable of switching the power supply for an associated heating module.

The term "module" in this description is used to denote an independent element distinct from similar elements and that can be easily separated from the heating space delimited by the frame.

Figure 1B:
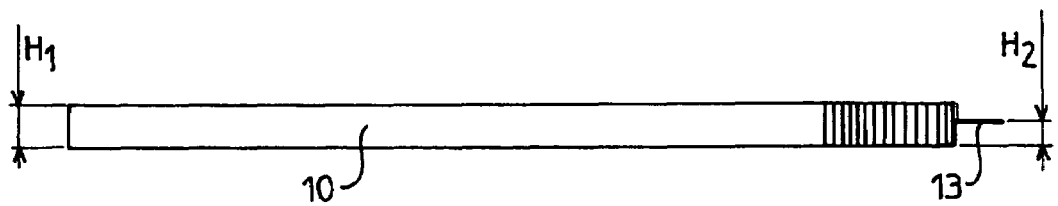
FIG. 1B is a diagram showing a side view of a metallic ribbon according to the invention.
Figure 1C:
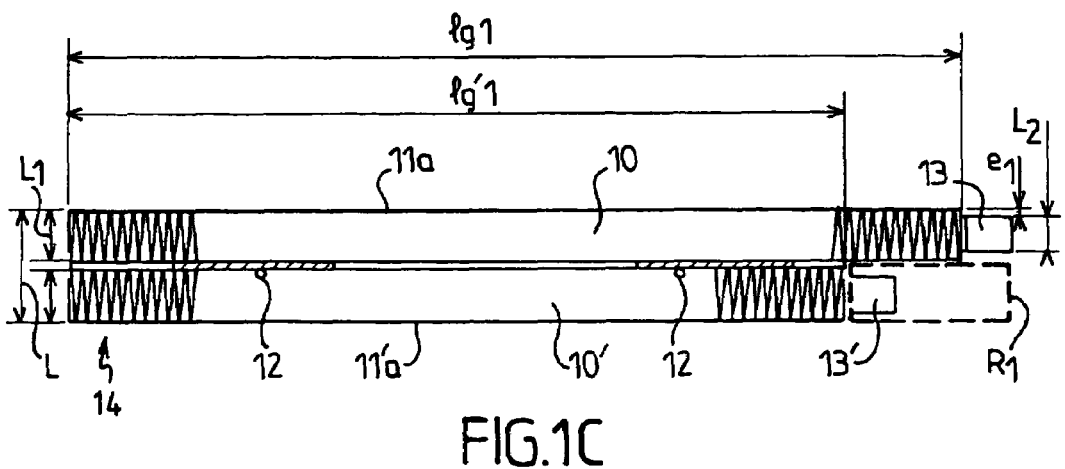
FIG. 1C is a diagram showing a top view of a heating module according to the invention.
Figure 1D:
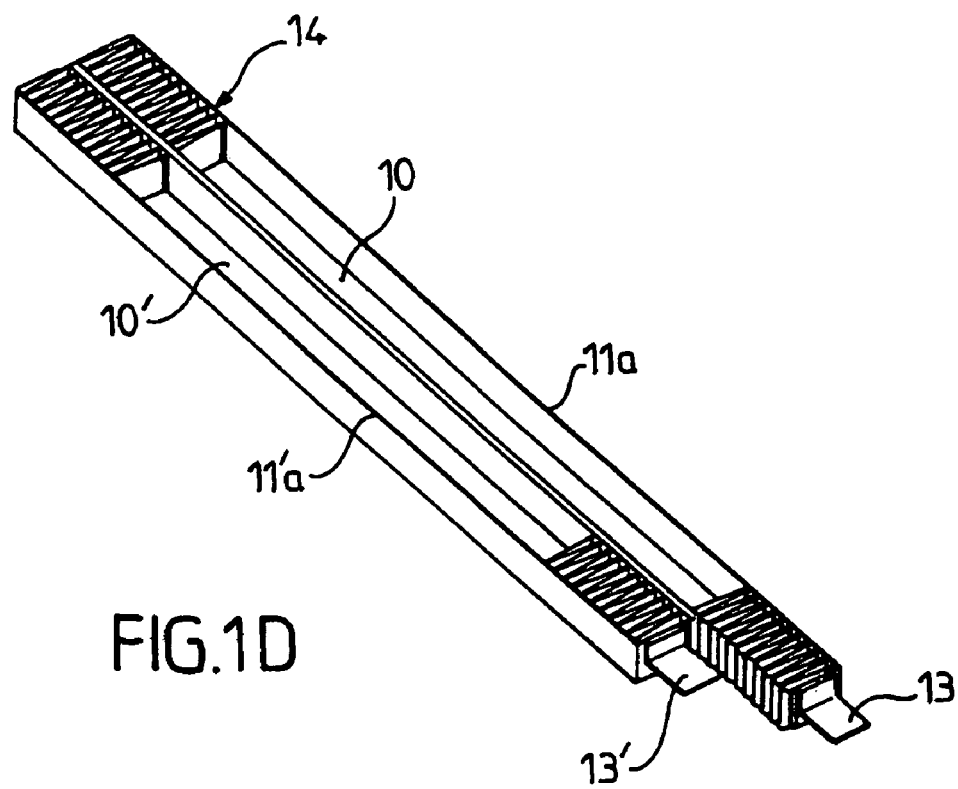
FIG. 1D is a perspective view of a heating module according to the invention.

FIGS. 1C and 1D represent the structure of a heating module according to the invention. An individual heating module 14 comprises a first metallic ribbon 10 with a first length lg1 and a second metallic ribbon 10' with a second length lg'1.

The metallic ribbons 10 and 10' are either folded or corrugated and may have the same height H1.

Only the ends of the metallic ribbons are shown in the Figures of the drawings, for reasons of clarity. Obviously, the metallic ribbons also extend between these two ends.

With reference to FIG. 1C, resistive elements with a positive temperature coefficient (PTC) are fixed between the two metallic ribbons in the same heating module 14. These resistive elements are in the form of a predetermined quantity of PTC stones 12. The PTC resistances are intrinsically protected against overheating and overcurrents.

The PTC stones 12 may be fixed between the two metallic ribbons 10 and 10' by gluing.

As an alternative, the PTC stones 12 may be fixed between the two metallic ribbons 10 and 10' by welding.

With reference to FIG. 1C, each metallic ribbon 10 and 10' of a heating module 14 may be held in place by gluing on at least one longitudinal strip 11$a$ and 11'$a$ respectively with a length adapted to the length of the ribbons.

In particular, during assembly of a heating module 14, the metallic ribbons 10 and 10' are connected so that their corresponding strips are located outside the heating module 14.

Each strip 11$a$ and 11'$a$ in a heating module 14 is fitted with a connection plug at one end, 13 and 13' respectively, for the electrical power supply. Each strip may be in the general form of an elongated plate with a length adapted to the length of the metallic ribbon, with a perpendicular extension on which the connection plug is fitted.

Connection plugs 13 and 13' shown in FIGS. 1B to 1D are fixed to one end of the metallic ribbons 10 and 10'. Each heating module 14 is assembled so that the connection plugs 13 and 13' are arranged on the same side.

FIG. 1B shows a front view of the heating module 14 according to the invention, on the side of the first metallic ribbon 10. The height H1 of the first metallic ribbon 10 may be equal to the height of the second metallic ribbon 10'. The connection plug 13 is fixed at a height H2 onto the first metallic ribbon 10. In particular, the connection plug 13' of the second metallic ribbon may be fixed at the same height H2 onto the second metallic ribbon.

The metallic ribbons 10 and 10' may all have the same width L1 and the associated strips 11$a$ and 11'$a$ may have the same thickness e1.

In one particular embodiment, the length $l_g1$ of the first metallic ribbon 10 may be greater than the length $l_g'1$ of the second metallic ribbon, which creates a rectangular indentation R1 in the associated heating module. The remainder of the description will be made with reference to this embodiment as a non-limiting example.

The metallic ribbons 10 and 10' are assembled so that:

the free end (i.e. the end on which there is no connection plug) of the first metallic ribbon 10 is aligned with the free end of the second metallic ribbon 10';

the other end at which the connection plug 13 of the first metallic ribbon 10 is fitted is offset from the other end of the second metallic ribbon 10'.

In particular, each power supply module 200 may be connected to two heating modules 14.1 and 14.2 as shown in FIG. 2, these two heating modules being arranged side by side. Thus, the second metallic ribbon 10'.1 of the heating module 14.1 and the second metallic ribbon 10'.2 of the heating module 14.2 are adjacent.

The metallic ribbons 10 and 10' may have sinusoidal triangular, rectangular or trapezoidal shapes.

The material from which the ribbons are made may be aluminium or copper.

The thickness of a metallic ribbon must be sufficient to enable working of the metal strip, but it must remain limited so that its resistance to airflow is not too high.

The structure of the heating module and the attachment of PTC stones by gluing has the advantage of not requiring a conducting metal tube to hold the PTC stones in place, nor any additional mechanical element such as a spring. Furthermore, assembly of this heating module structure by gluing is simple and inexpensive.

With reference to FIG. 2, the housing 15 of the heating device according to the invention comprises longitudinal walls 17 that delimit heating compartments 16. Each heating compartment 16 is shaped so that it can contain the different heating modules 14. Each heating module 14 integrated into the heating device is fixed in the heating compartment 16 in contact with the longitudinal walls 17. Thus, each heating module may be added to or removed from the heating device independently of the other heating modules, and as a function of the total required heating power.

The power supply compartments 20 are generally rectangular in shape and can house a power supply module 200 to supply power to the heating modules 14. In the embodiment shown in FIG. 2, a power supply module 200 is provided to supply power to two heating modules. The length of the first ribbon 10 is greater than the length of the second ribbon 10', which optimises occupancy of the heating space.

Figure 3:
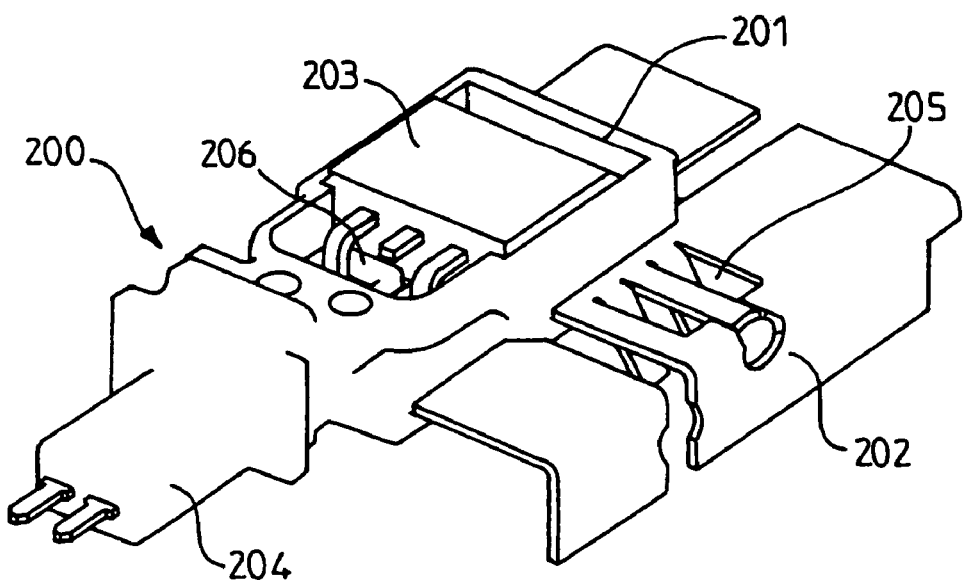
FIG. 3 is a perspective view of a power supply module according to the invention.

FIG. 3 is a perspective view of a power supply module 200. Each power supply module 200 comprises a conventional power supply switch 203, for example a MOSFET transistor, integrated with a metallic support 202 by brazing.

The metallic support 202 is a conductor of electricity and for example may be made of copper, or a copper alloy, or it may preferably be tin-plated. The metal support 202 is integrated into the power supply compartment 200 by insert moulding 201.

The insert moulding 201 is arranged around the power supply switch 203 and holds the electrical connections with the power supply switch 203. Furthermore, insert moulding contributes to protecting the power supply switch.

The insert moulding may partially or fully cover the power supply switch 203.

The power supply modules 200 in the heating device according to the invention are placed in the airflow to be heated.

The zone delimited by insert moulding 201 of the metallic support comprises a sealed coating 206 to protect the power supply switch 203 against corrosion, water splashes or dust. This coating may be silica gel, glue or a compound capable of protecting the power supply switch.

The power supply module 200 also comprises openings or louvers 205 formed in the metallic support 202. Air to be heated passes through these openings 205 to dissipate heat from the electronic switch 203 and thus contribute to its cooling.

The dimensions of the metallic support 202 are chosen as a function of the required cooling for the power supply switch 203 and its impact on the thermal equilibrium between airflows to the left and to the right, when the heating device 8' is mounted in an air conditioning unit.

As a complement, the control circuit is arranged on one side of the housing 15 in the power supply control compartment 50 and the power supply compartments 20 are arranged in parallel close to the control circuit along the transverse direction D with an equal spacing between them.

The power supply switch 203 and the control circuit that controls it supply power to the electrical heating device.

The control circuit also comprises means of varying the power capable of varying the total heating power supplied by the heating device. These power variation means operate by pulse width modulation of the voltage output to each heating module.

In the particular embodiment in which a power supply module is associated with a group of two heating modules as shown in FIG. 2, the space occupied by the power supply compartments 200 may be optimised as a function of the heating space by choosing dimensions of the power supply compartments 20 as a function of the dimensions of the heating compartments 16.

In particular, the power supply compartments 200 may be generally rectangular in shape with a width $L_{alim}$ equal to the width L of the heating compartments 16.

Figure 1E:
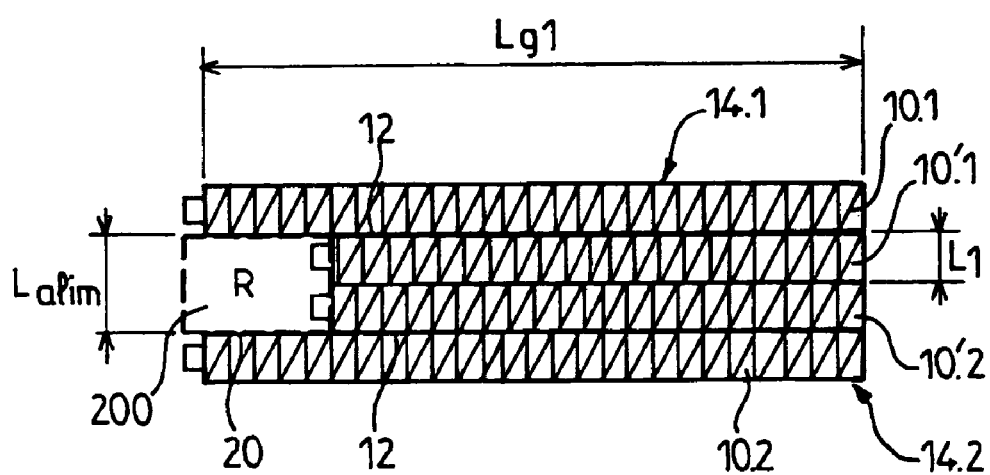
FIG. 1E is a diagram showing a top view of a heating module.

Moreover, successive heating compartments 16 are arranged side by side and in line along the transverse direction D. Due to the indentations R1 in each heating compartment 16 and the mutual position of the heating compartments 16 with respect to each other, the indentations in the two successive heating compartments delimit a rectangle R in which an associated power supply module 200 is arranged as shown in FIG. 1E.

The power supply modules 200 participate only very slightly in heating the air due to their position with respect to the airflow passing through the heating device. Therefore, the power supply compartments 20 form a slightly "active" zone in the heating space delimited by the housing 15.

Figure 4:
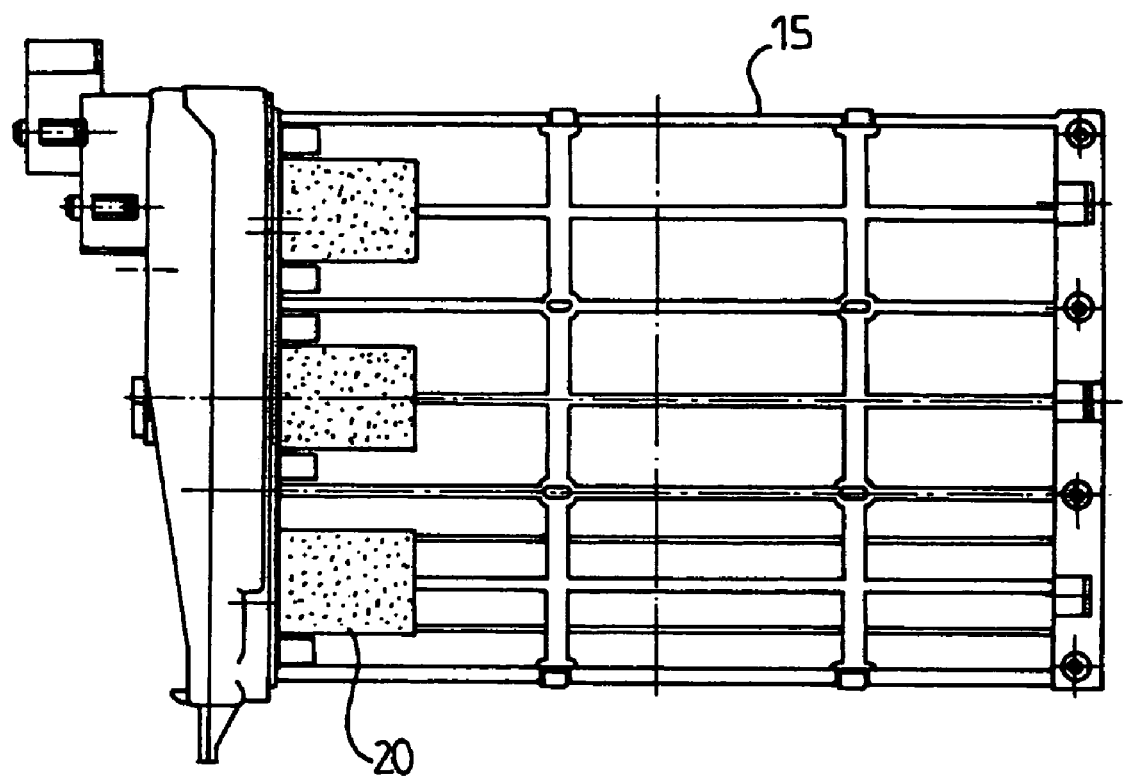
FIG. 4 is a front view of the heating device according to the invention, showing the space occupied by the power supply modules.
Figure 5:
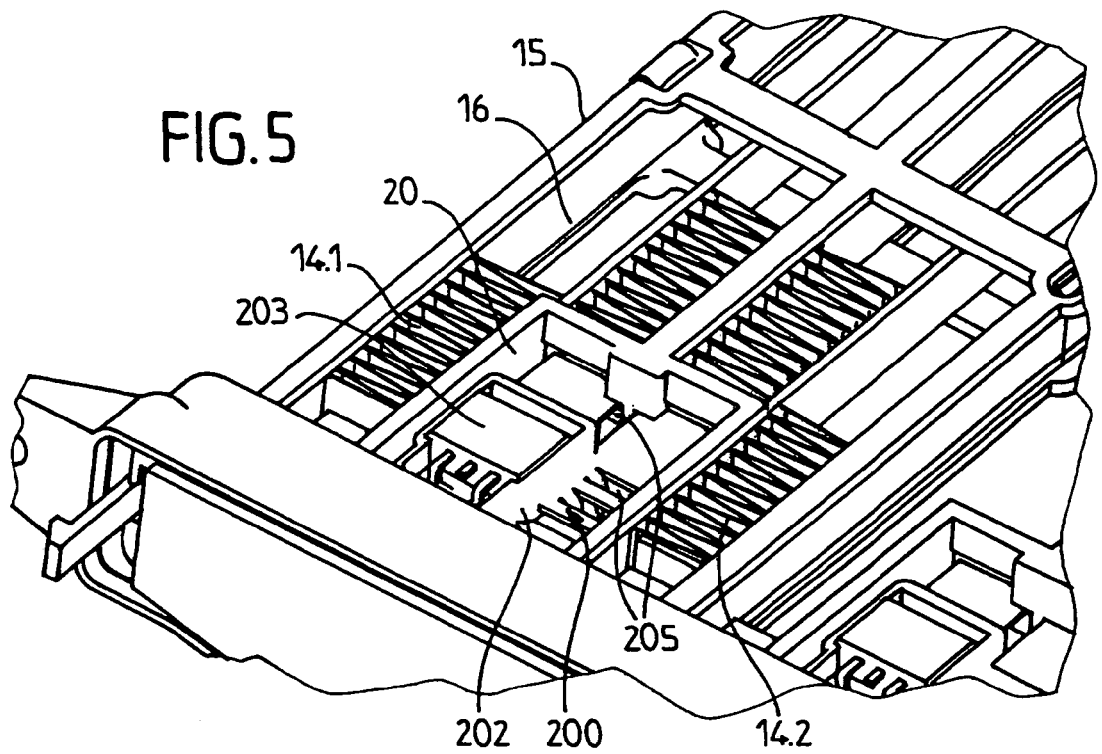
FIG. 5 is a partial top view of a heating device according to the invention.

However, the arrangement and the structure of the power supply modules 200 in the heating device limit the space occupied by this only slightly active zone shown in black in FIG. 4. Although in embodiments in prior art this zone occupies about 25% of the heating space, in the heating device according to the invention this zone occupies about 12% of the heating space, which improves performances of the heating device.

Each heating module 14 is connected to the associated power supply module 200 by its connection plugs 13 and 13'.

The bus bars 55 and 56 shown in FIG. 6 may be fixed in the housing 15 by snap riveting or by insert moulding. The power supply connections between:
- the bus bar 56, for example a ground bus bar GND and the power supply module 202,
- the bus bar 55, for example a bus bar at the +12 V potential and the heating module 14 through the connection plug 13, and
- the heating module 14 and the power supply module 200 through the connection plug 13', are made by electrical welding.

The bus terminals 55 and 56, the power supply module 200 and the connection plugs 13 and 13' of a heating module 14 are shaped to allow sufficient volume for the welding electrode during assembly.

FIG. 6 shows elements connecting the heating device to the power supply control circuit mounted on the printed circuit board. The side wall of the housing 15 that is connected to the power supply control circuit includes connector terminals 204 for each power supply module, a power supply connection plug 550 from the +12 V bus bar, and a ground connection plug 560 from the GND bus bar.

In another embodiment of the invention, each power supply module 200 may be connected to a single heating module 14. According to this embodiment, each power supply module may be connected to the associated heating module to form a modular element. Each power supply compartment 20 then forms a modular compartment with the associated heating compartment 16.

According to another aspect of the invention, a cover 19 comprising openings with the same shape and dimensions as the compartments 16 is fixed onto the housing 15 using a connection system. For example, such a cover may be plugged onto the housing 15 due to a connection system comprising a set of notches arranged on the outside walls of the housing 15 to be fitted with clips or staples formed in the cover. As an alternative, the cover may be fixed by gluing by ultrasound.

This cover may comprise a system for fixing and positioning heating modules similar to that for the housing 15.

The housing 15 and the cover 19 thus delimit the section of the air passage through the heating modules 14 by the heating compartments 16, which heats the airflow.

The housing 15, the cover 19 and the cap 9 are made from electrically insulating materials such as a plastic material capable of resisting the maximum temperature that occurs in service, which is of the order of 150° C. The housing 15 and the cover 19 may all be moulded in a single part.

According to another aspect of the invention, the power supply control compartment 50 in which the power supply control circuit is housed is separated from the power supply compartments 20, which reduces the dimensions of the printed circuit board compared with prior art and consequently also the costs of the heating device.

The heating device 8' may also comprise attachment and guide means to facilitate its assembly and integration in a heating and air conditioning installation.

The metallic ribbons 10 and 10' are arranged in a heating module so that each of the elementary faces defined by folding or corrugation are approximately parallel to the airflow through the housing, which limits pressure losses due to air passage in the heating device.

Ribbons may be covered by a coat, for example an insulating varnish, that performs an electrical insulation function.

Each heating module 14 comprises elements that make it independent and separable from the other elements forming the heating space, namely a connection to an electronic switch 203 itself independent, metallic ribbons 10 and 10' and a PTC resistive element 12.

Thus, if a malfunction is detected on a given heating module, this heating module can be replaced without any need to replace the other heating modules contained in the heating space.

Similarly, each power supply module is independent of the other elements making up the heating space and can be removed from it or added to it without modifying its general operation.

This architecture also makes it possible to vary the performances of the heating device and therefore its total heating power. Thus in the example in FIG. 2, if the heating power of a heating module is 330 W, then a total heating power of 1 kW can be obtained by using three heating modules, or 2 kW can be obtained by using 6 heating modules.

These performances can also be modified by varying the quantity of PTC stones used in the heating modules 14.

Therefore the same basic architecture of a heating device according to the invention can give variable heating performances, without using additional tools.

The heating device 8' of the invention can be integrated into the heating or air conditioning device in FIG. 1A, but is not limited to this example. Thus, the heating device according to the invention may be integrated into a vehicle air conditioning device comprising a cooling circuit evaporator in the channel 3, on the upstream side of the heat exchanger 8 occupying a part of the section of the channel.

The invention also proposes a method of installing the heating device including the housing 15, starting from electrical heating modules 14 and power supply modules 200. The method includes the following steps:

1) placing the power supply modules 200 in the housing 15, 2) placing the heating modules 14 in the housing 15, 3) positioning and fixing the cover 19 on the housing 15, 4) performing a welding operation for an electrical connection between each power supply module and the group of associated heating modules, 5) positioning the electrical power supply control circuit on a power supply control compartment on one side of the housing 15, 6) performing an additional welding operation for an electrical connection between the electrical connections and the power supply control circuit, 7) positioning and fixing the cap 9 on the power supply control compartment.

Obviously, the invention is not limited to the embodiments described above. It encompasses all variant embodiments that a person skilled in the art could envisage within the context of the claims given below.

The invention claimed is:

1. A heating device, comprising a housing (15) through which air to be heated can pass delimiting a heating space controlled by an electrical power supply control circuit connected to a power supply source, characterised in that the heating space comprises a plurality of electrical heating modules (14) mounted to the housing (15), each heating module being independently separable from the housing (15) and the heating space and including a first and a second approximately parallel metallic ribbon (10, 10') along a transverse direction (D) and by resistive elements with a positive temperature coefficient (12) fixed between the two metallic ribbons, the housing (15) includes power supply compartments (20) with a shape suitable for housing power supply modules (200) that can be connected to the electrical power supply control circuit and to at least one heating module (14), each power supply module comprising an electronic switching element (203), and for each heating module (14), the first metallic ribbon (10) is longer than the second metallic ribbon (10') which creates an indentation generally rectangular in shape (R1) in the heating module.

2. A heating device according to claim 1, characterised in that the resistive elements with a positive temperature coefficient are fixed between the two metallic ribbons by gluing.

3. A heating device according to claim 1, characterised in that the resistive elements with a positive temperature coefficient are fixed between the two metallic ribbons by welding.

4. A heating device according to any one of the previous claims, characterised in that the housing (15) includes heating compartments (16) shaped to house a number of heating modules (14) chosen as a function of the total required heating power.

5. A heating device according to claim 1, characterised in that the power supply control circuit is arranged on one side of the housing, in a power supply control compartment (50) and in that the power supply compartments (20) are arranged in parallel close to the control circuit along the transverse direction (D) with an equal spacing between each compartment.

6. A heating device according to one of claims 1 and 5, characterised in that the power supply module (200) also comprises a metallic support (202) connected to the power supply source, on which the electronic switching element (203) is fixed.

7. A heating device according to claim 6, characterised in that the metallic support (202) comprises an insert moulding (201) around the electronic switching element (203) that can hold the electrical connections (204) with the electronic switching element.

8. A heating device according to claim 7, characterised in that the zone delimited by the insert moulding of the metallic support (202) comprises a sealed coat (206) chosen from among the silica gel, glue and compounds that provide a protection for the electronic switching element.

9. A heating device according to claim 8, characterised in that the metallic support (202) comprises louver type openings (205) arranged on its surface, through which openings air to be heated passes so as to facilitate the dissipation of heat from the electronic switching element (203).

10. A heating device according to claim 1, characterised in that each metallic ribbon (10, 10') of a heating module (14) is held on at least one longitudinal strip (11$a$, 11'$a$) with a length matching that of the ribbons.

11. A heating device according to claim 10, characterised in that the strips (11$a$, 11'$a$) of each heating module (14) are provided with a connection plug (13, 13') on one end, the connection plugs of the strips all being located on the same side during assembly of the heating module (14).

12. A heating device according to claim 1, characterised in that the power supply compartments (20) are generally rectangular in shape and in that the width of a power supply compartment ($L_{alim}$) is approximately equal to the width of a heating compartments (L).

13. A heating device according to claim 12, characterised in that each power supply module (200) may be connected to a group of two heating modules (14.1, 14.2) and in that the two heating modules are arranged side by side.

14. A heating device according to claim 13, characterised in that the successive heating compartments (16) are side by side are and are in line along the transverse direction (D), the indentations in the two successive heating modules thus forming a rectangle (R) within which a power supply compartment is arranged (20).

15. A heating device according to claim 12, characterised in that each power supply module (200) can be connected to a heating module (14), and in that the power supply module and the associated heating module are connected to form a modular element, each power supply compartment forming a modular compartment with an associated heating compartment.

16. A heating device according to claim 5, characterised in that it comprises a cover (19) fixed on the housing.

17. A heating device according to claim 1, characterised in that the metallic ribbons (10, 10') of each heating module (14) are provided with an electrical insulating coating and/or a protective coating against corrosion.

18. A heating device according to claim 5, characterised in that the power supply control compartment (50) is separated from the power supply compartments (20).

19. A heating device as set forth in claim 1 wherein said housing (15) comprises a plurality of heating compartments (16) each shaped to house one of said plurality of heating modules (14).

* * * * *

UNITED STATES PATENT AND TRADEMARK OFFICE
CERTIFICATE OF CORRECTION

PATENT NO. : 7,627,234 B2  Page 1 of 1
APPLICATION NO. : 10/558605
DATED : December 1, 2009
INVENTOR(S) : Pierron et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 445 days.

Signed and Sealed this

Second Day of November, 2010

David J. Kappos
*Director of the United States Patent and Trademark Office*